US009222437B2

(12) United States Patent
Machnaim et al.

(10) Patent No.: US 9,222,437 B2
(45) Date of Patent: Dec. 29, 2015

(54) TRANSITION DUCT FOR USE IN A TURBINE ENGINE AND METHOD OF ASSEMBLY

(71) Applicant: General Electric Company, Schenectady, NY (US)

(72) Inventors: Joseph Machnaim, Bangalore, IN (US); Brian David Keith, Cincinnati, OH (US); Scott Michael Carson, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 556 days.

(21) Appl. No.: 13/624,543

(22) Filed: Sep. 21, 2012

(65) Prior Publication Data
US 2014/0086739 A1    Mar. 27, 2014

(51) Int. Cl.
F04D 29/54 (2006.01)
F02K 3/065 (2006.01)
B23P 11/00 (2006.01)
F01D 9/02 (2006.01)

(52) U.S. Cl.
CPC ............... F02K 3/065 (2013.01); B23P 11/00 (2013.01); F01D 9/02 (2013.01); F04D 29/547 (2013.01); Y10T 29/49323 (2015.01)

(58) Field of Classification Search
CPC ............................. F02K 3/065; F04D 29/547
USPC ............................................. 415/199.4, 199.5
See application file for complete search history.

(56) References Cited

U.S. PATENT DOCUMENTS

| 6,708,482 | B2 | 3/2004 | Seda |
| 7,610,179 | B2 | 10/2009 | Florea et al. |
| 8,061,980 | B2 | 11/2011 | Praisner et al. |
| 8,845,286 | B2 * | 9/2014 | Ramachandran et al. . 415/199.5 |
| 2006/0051200 | A1 | 3/2006 | Hoeger et al. |
| 2006/0069533 | A1 * | 3/2006 | Florea et al. ....................... 703/1 |
| 2006/0288686 | A1 * | 12/2006 | Cherry et al. ................ 60/226.1 |
| 2007/0207035 | A1 * | 9/2007 | Girgis et al. .............. 416/223 A |
| 2008/0138197 | A1 | 6/2008 | Green et al. |
| 2010/0209238 | A1 * | 8/2010 | Praisner et al. ............ 415/208.2 |
| 2011/0081228 | A1 | 4/2011 | Durocher et al. |
| 2012/0275922 | A1 * | 11/2012 | Praisner et al. ............ 416/223 A |

FOREIGN PATENT DOCUMENTS

| EP | 1577491 A1 | 9/2005 |
| EP | 1643083 A2 | 4/2006 |
| EP | 2192269 A2 | 6/2010 |

OTHER PUBLICATIONS

Search Report from PCT/US2013/055804 dated Dec. 4, 2013.

* cited by examiner

*Primary Examiner* — Christopher Verdier
*Assistant Examiner* — Justin Seabe
(74) *Attorney, Agent, or Firm* — General Electric Company; William Scott Andes

(57) ABSTRACT

A transition duct for use in a turbine engine is provided. The transition duct includes a radially inner wall and a radially outer wall positioned about the radially inner wall defining a flow passage therebetween. The radially outer wall extends and is contoured from an upstream end to a downstream end of the transition duct. As such, the slope of the radially outer wall increases from the upstream end to a predetermined axial location and decreases from the predetermined axial location to the downstream end.

18 Claims, 5 Drawing Sheets

TRANSITION DUCT FOR USE IN A TURBINE ENGINE AND METHOD OF ASSEMBLY

BACKGROUND OF THE INVENTION

The field of the disclosure relates generally to turbine engines and, more specifically, to a transition duct for use in a turbine engine.

At least some known gas turbine engines include a forward fan, a core engine, and a low-pressure turbine (LPT) coupled together in serial flow relationship. The core engine includes at least one compressor, a combustor, and a high-pressure turbine (HPT). More specifically, the compressor and HPT are coupled through a shaft to define a high-pressure rotor assembly. Air entering the core engine is compressed, mixed with fuel, and ignited to form a high energy gas stream. The high energy gas stream is directed through the HPT to rotatably drive the HPT such that the shaft rotatably drives the compressor. The high energy gas stream is then channeled towards the LPT coupled downstream from the HPT via a transition duct.

Generally, a known HPT has a smaller radius than a known LPT. As such, known transition ducts coupled between the HPT and the LPT have an "S" shaped cross-section to facilitate flow communication therebetween. Generally, it is desirable to transition from the smaller-radius high-pressure turbine to the larger-radius low-pressure turbine within as short an axial distance as possible. Such a quick transition with a shorter transition duct facilitates reducing the weight of the overall turbine assembly and facilitates increasing the performance of the engine. However, using a shorter transition duct with aggressive curvature may lead to flow separation at the boundary layers of the transition duct walls.

BRIEF DESCRIPTION OF THE INVENTION

In one aspect, a transition duct for use in a turbine engine is provided. The transition duct includes a radially inner wall and a radially outer wall positioned about the radially inner wall defining a flow passage therebetween. The radially outer wall extends and is contoured from an upstream end to a downstream end of the transition duct. As such, the slope of the radially outer wall increases from the upstream end to a predetermined axial location and decreases from the predetermined axial location to the downstream end.

In another aspect, a turbine assembly is provided. The turbine assembly includes a high-pressure turbine, a low-pressure turbine, and a transitions duct coupled therebetween. The high-pressure turbine is positioned about a centerline axis at a first radius from the centerline axis and the low-pressure turbine is positioned about the centerline axis at a second radius from the centerline axis that is greater than the first radius. The transition duct includes a radially inner wall and a radially outer wall positioned about the radially inner wall defining a flow passage therebetween. The radially outer wall extends and is contoured from an upstream end to a downstream end of the transition duct. As such, the slope of the radially outer wall increases from the upstream end to a predetermined axial location and decreases from the predetermined axial location to the downstream end.

In yet another aspect, a method of assembling a transition duct for use in a turbine assembly is provided. The transition duct includes a radially inner wall and a radially outer wall. The method includes positioning the radially outer wall about the radially inner wall such that a flow passage is defined therebetween and extending the radially outer wall from an upstream end to a downstream end of the transition duct. The method also includes contouring the radially outer wall from the upstream end to the downstream end such that a slope of the radially outer wall increases from the upstream end to a predetermined axial location and decreases from the predetermined axial location to the downstream end.

DETAILED DESCRIPTION OF THE INVENTION

Embodiments of the present disclosure relate to the use of a transition duct to couple the discharge outlet of a high-pressure turbine (HPT) to the inlet of a low-pressure turbine (LPT) in a gas turbine engine. Generally, it is desirable to quickly transition from the smaller-radius HPT to the larger-radius LPT with a transition duct to channel fluid flowing therethrough. Transition to the larger radius facilitates improving LPT performance and efficiency. However, using a transition duct that has a shorter axial length with aggressive outer wall slope may lead to boundary layer flow separation of the fluid flowing therethrough. Furthermore, known transition ducts include struts and/or fairings extending therethrough that are used to support the turbine center frame. These known struts and fairings disrupt the flow of fluid flowing through the transition duct. Accordingly, flow separation may also occur on the fairing or at the interface between the fairing and the outer wall, i.e. at the location where both the boundary layers interact.

As such, in the exemplary embodiment, the transition duct described herein facilitates reducing flow separation of fluid channeled from the HPT to the LPT. More specifically, the transition duct includes an aggressive outer wall slope from the duct inlet to a predetermined axial location in the transition duct, and reduced outer wall slope from the predetermined axial location to the duct discharge. In the exemplary embodiment, the predetermined axial location is the thickest portion ($T_{max}$ location) of the aerodynamic strut fairing. Accordingly, the transition duct described herein facilitates improving LPT performance and efficiency by controlling the boundary layer interaction between the outer wall of the transition duct and the strut fairing.

Figure 1:
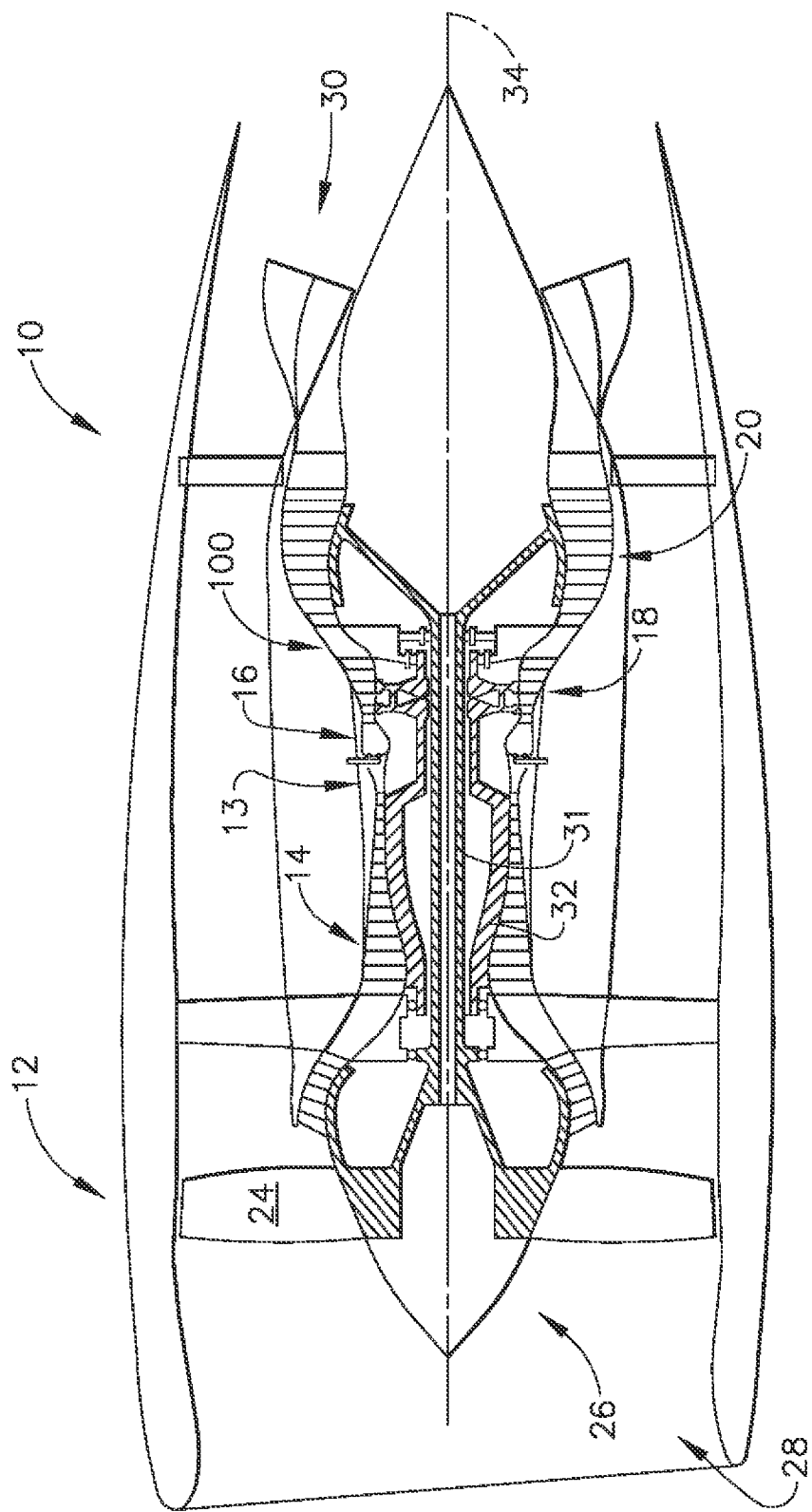
FIG. 1 is a cross-sectional view of an exemplary turbine engine.

FIG. 1 is a schematic view of an exemplary gas turbine engine 10 that includes a fan assembly 12 and a core engine 13 including a high pressure compressor 14, a combustor 16, and a high-pressure turbine (HPT) 18. Engine 10 also includes a low-pressure turbine (LPT) 20 and a turbine center frame/transition duct 100 coupled between HPT 18 and LPT 20. Fan assembly 12 includes an array of fan blades 24 that extend radially outward from a rotor disk 26. Engine 10 has an intake side 28 and an exhaust side 30. Fan assembly 12 and LPT 20 are coupled by a low-speed rotor shaft 31, and compressor 14 and HPT 18 are coupled by a high-speed rotor shaft 32.

Generally, during operation, air flows axially through fan assembly 12, in a direction that is substantially parallel to a centerline 34 that extends through engine 10, and compressed air is supplied to high pressure compressor 14. The highly compressed air is delivered to combustor 16. Combustion gas flow (not shown) from combustor 16 drives turbines 18 and 20. HPT 18 drives compressor 14 by way of shaft 32 and LPT 20 drives fan assembly 12 by way of shaft 31.

As used herein, the term "axial", "axially", or "coaxially" refers to a direction along or substantially parallel to centerline 34. Furthermore, as used herein, the term "radial" or "radially" refers to a direction substantially perpendicular to centerline 34.

Figure 2:
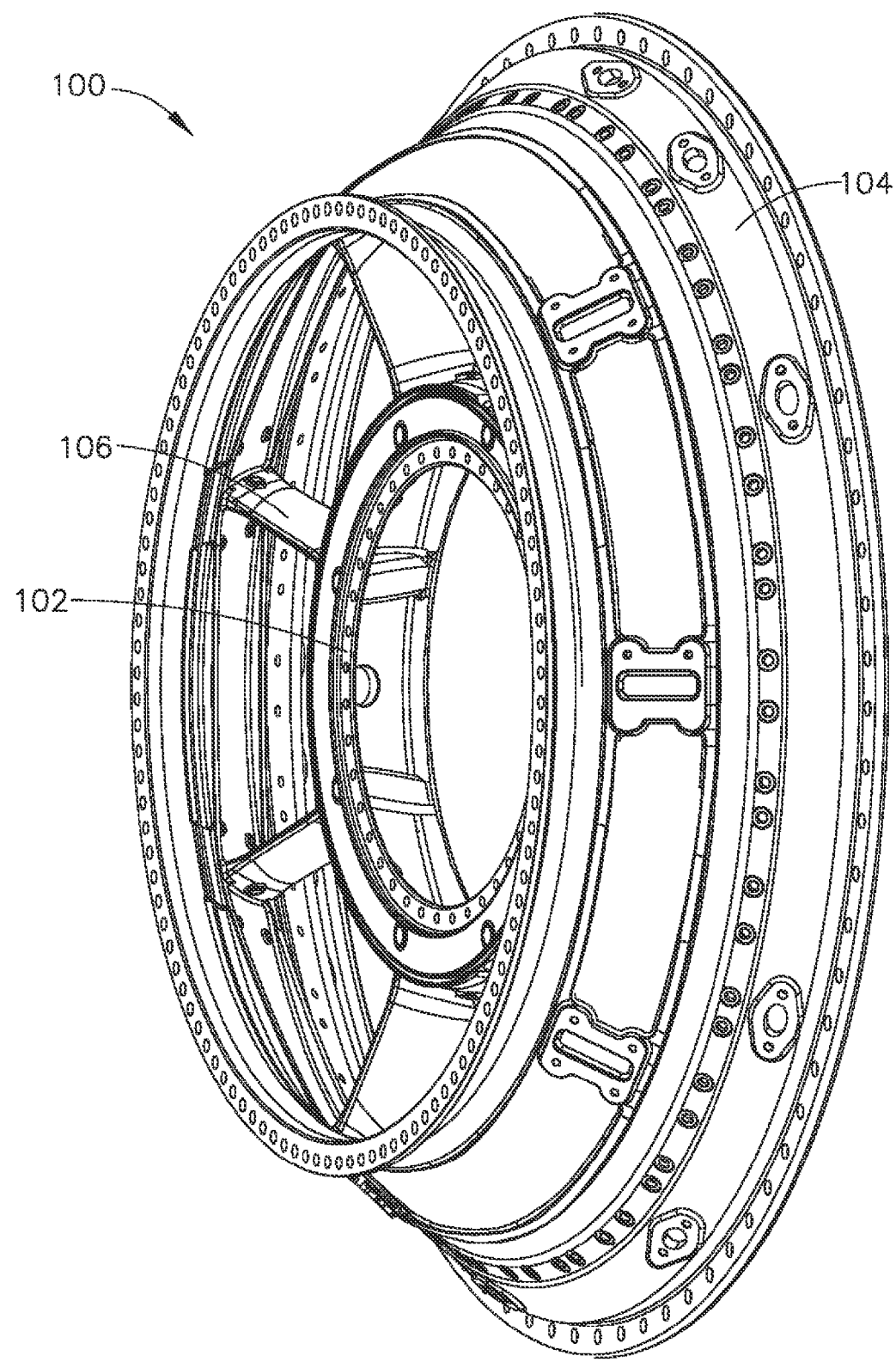
FIG. 2 is a perspective view of an exemplary turbine center frame that may be used in the turbine engine shown in FIG. 1.
Figure 3:
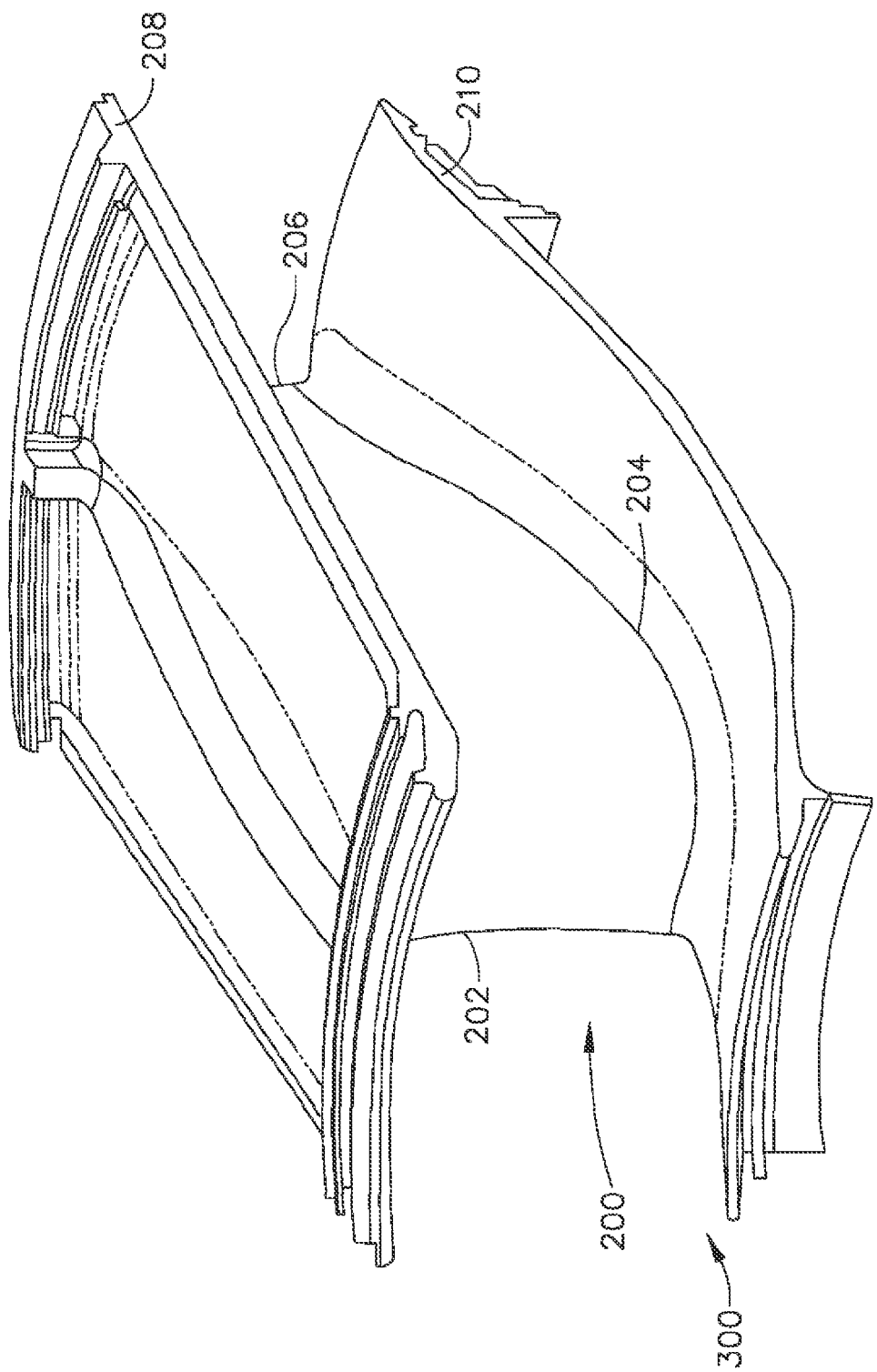
FIG. 3 is a perspective view of an exemplary fairing that may be used with the turbine center frame shown in FIG. 2.

FIG. 2 is a perspective view of an exemplary turbine center frame 100, and FIG. 3 is a perspective view of a fairing 200 that may be used with the turbine center frame 100. Turbine center frame 100 includes a central hub 102 and an outer ring 104 positioned about central hub 102. In the exemplary embodiment, central hub 102 and outer ring 104 are coupled together with struts 106 extending radially therebetween.

Furthermore, in the exemplary embodiment, turbine center frame 100 uses a plurality of fairings 200 to protect turbine center frame 100 from a hot gas path environment. Fairing 200 includes a leading edge 202, a $T_{max}$ location 204, and a trailing edge 206. In the exemplary embodiment, fairing 200 has an aerodynamic cross-sectional shape. As such, $T_{max}$ location 204 corresponds to the axial location of the thickest portion of fairing 200. For example, in one embodiment, $T_{max}$ location 204 is located from leading edge 202 at about 30% to about 45% the length 316 (not shown in FIG. 2) of fairing 200, or more specifically about 33% of length 316. In one embodiment, a plurality of fairings 200 are arranged about central hub 102 and include a radially outer shroud 208 and a radially inner shroud 210 coupled thereto. As such, a substantially annular transition duct 300 is formed by shrouds 208 and 210 about centerline 34 (shown in FIG. 1).

Figure 4:
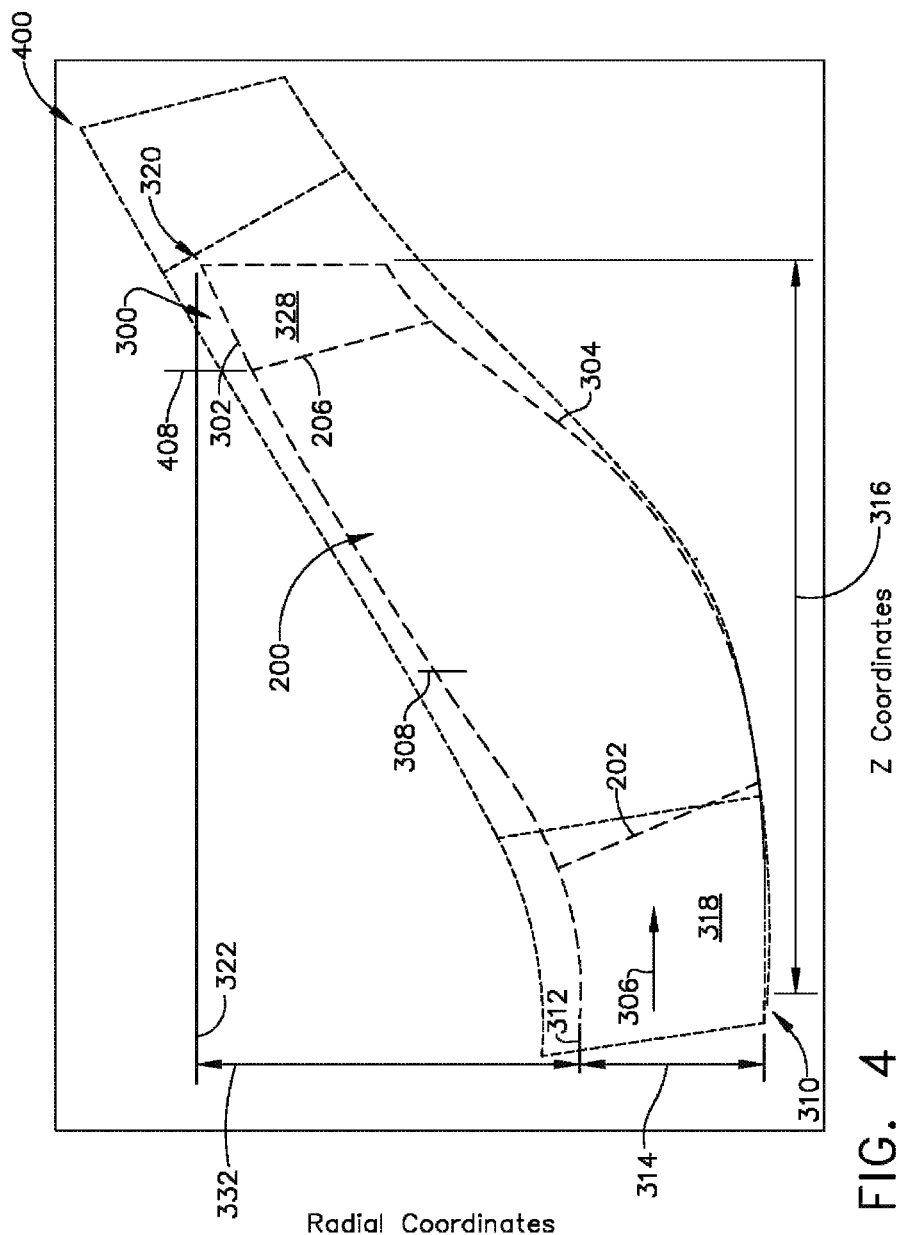
FIG. 4 is a schematic cross-sectional view of the transition duct formed from the fairing shown in FIG. 3.
Figure 5:
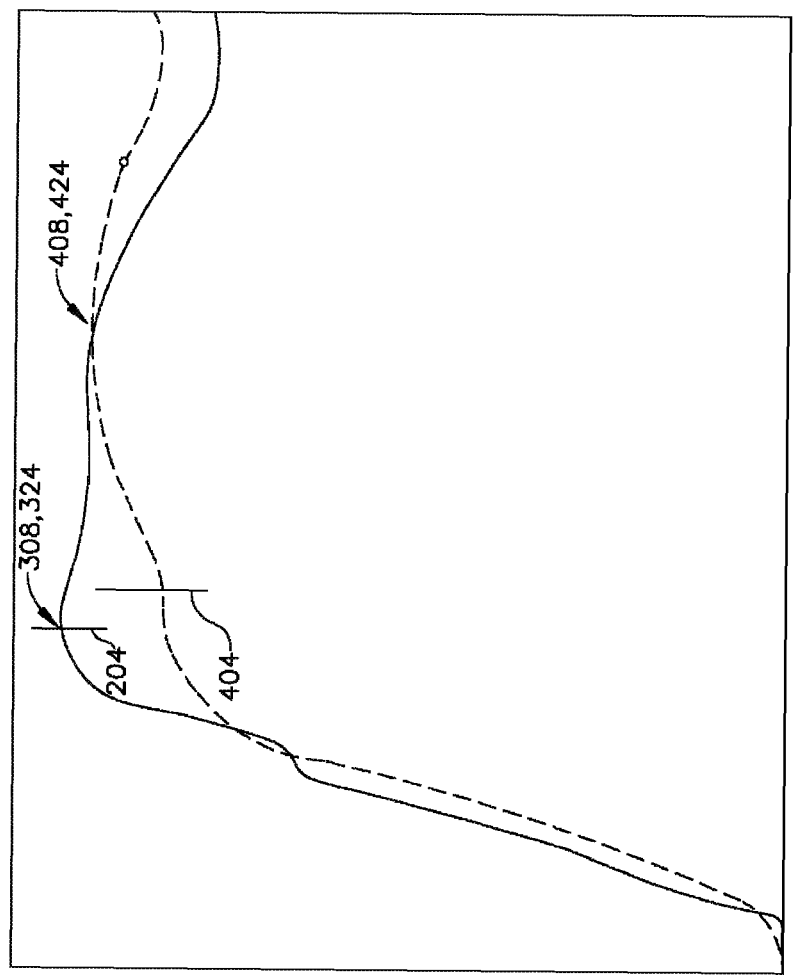
FIG. 5 is a normalized view of the local wall slope for an exemplary radially outer wall that may be used in the transition duct shown in FIG. 4.

FIG. 4 is a schematic cross-sectional view of transition duct 300 and a transition duct 400, and FIG. 5 is a normalized view of the local wall slope for a radially outer wall 302 that may be used in transition duct 300. Although transition duct 300 will be discussed in further detail, it should be understood that the same may apply to transition duct 400. In the exemplary embodiment, transition duct 300 includes a radially inner wall 304 formed from radially inner shroud 210 (shown in FIG. 3) and radially outer wall 302 formed from radially outer shroud 208 (shown in FIG. 3). Radially outer wall 302 is positioned about radially inner wall 304 such that a flow passage 306 is defined therebetween.

In some embodiments, radially outer wall 302 and radially inner wall 304 extend and are contoured from an upstream end 310 of transition duct 300 to a downstream end 320 of transition duct 300 to facilitate coupling HPT 18 in flow communication with LPT 20 (shown in FIG. 1). More specifically, the curvature and slope of radially outer wall 302 are controlled to facilitate reducing flow separation within transition duct 300. For example, in the exemplary embodiment, radially outer wall 302 includes an aggressive outer wall slope from upstream end 310 to a predetermined axial location 308, and reduced slope from predetermined axial location 308 to downstream end 320 of transition duct 300. As used herein, the term "slope" refers to the angle, at any given point, of radially outer wall 302 and radially inner wall 304 with respect to centerline 34.

Accordingly, in the exemplary embodiment, radially outer wall 302 at upstream end 310 is located at a first radial distance 312 from centerline 34 (shown in FIG. 1), and radially outer wall 302 at downstream end 320 is located at a second radial distance 322 from centerline 34. Second radial distance 322 is greater than first radial distance 312 such that a AR 332 is present therebetween. Furthermore, in the exemplary embodiment, transition duct 300 includes a height 314, length 316, a first area 318 at upstream end 310, and a second area 328 at downstream end 320. As such, controlled radially outer wall 302 diffusion is applicable when transition duct 300 has radius ratio (AR 332/height 314) of greater than about 2.0, a length 316/height 314 ratio of between about 2.75 and 4.50, and an area ratio (second area 328/first area 318) of greater than about 1.35.

In the exemplary embodiment, the contouring and slope of radially outer wall 302 facilitates controlling the boundary layer interaction at radially outer wall 302 and at fairing 200. For example, radially outer wall 302 is configured to facilitate preventing flow separation at radially outer wall 302 caused by aggressive outer wall slope beyond predetermined axial location 308, and/or flow separation caused by the presence of fairing 200 within flow passage 306. More specifically, in the exemplary embodiment, the slope of radially outer wall 302 increases from upstream end 310 to predetermined axial location 308, and decreases from predetermined axial location 308 to downstream end 320. In the exemplary embodiment, the region downstream from predetermined axial location 308 corresponds to a region within transition duct 300 that may have a high probability of flow separation as fairing 200 diffuses the flow in the circumferential direction.

In one embodiment, predetermined axial location 308 corresponds to $T_{max}$ location 204 of fairing 200 that is positioned within flow passage 306 between upstream end 310 and downstream end 320 of transition duct 300. In another embodiment, and with respect to transition duct 400, a predetermined axial location 408 is located downstream from $T_{max}$ location 404. As fluid is channeled substantially axially through transition duct 300, the presence of fairing 200 in flow passage 306 facilitates creating flow separation therein, particularly at leading edge 202 and downstream from $T_{max}$ location 204.

In another embodiment, predetermined axial location 308 corresponds to an axial location within transition duct 300 where flow separation may become present at the boundary layer of radially outer wall 302. More specifically, flow separation at the boundary layer of radially outer wall 302 is caused by the aggressive outer wall slope. Accordingly, radially outer wall 302 is contoured to facilitate preventing flow separation of fluid channeled through transition duct 300 with fairing 200.

In the exemplary embodiment, transition duct 300 facilitates increasing turbine efficiency while preventing flow separation by increasing the slope of radially outer wall 302 from upstream end 310 to predetermined axial location 308, and decreasing the slope of radially outer wall 302 from predetermined axial location 308 to downstream end 320. As such, in the exemplary embodiment, radially outer wall 302 has a slope of about 0° at upstream end 310. The slope of radially outer wall 302 then increases to a maximum wall slope 324 at predetermined axial location 308, or a maximum wall slope 424 at predetermined axial location 408. Maximum wall slopes 324 and 424 are greater than about 40°, and more specifically from about 40° to about 50°. The slope of radially outer wall 302 then decreases from predetermined axial location 308 such that the slope of radially outer wall 302 at downstream end 320 is no less than about 30°.

The transition duct described herein facilitates improving the performance of a turbine assembly by facilitating reducing flow separation within a shorter transition duct. The transition duct described herein uses an aggressive outer wall slope to quickly transition between a high-pressure turbine and a low-pressure turbine. However, the quick transition and the presence of aerodynamic struts that extend radially through the transition duct may lead to outer wall diffusion and/or flow separation therein. As such, the curvature and slope of the radially outer wall of the transition duct is controlled to facilitate reducing flow separation therein, thereby improving the efficiency of the low-pressure turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transition duct for use in a turbine engine, the transition duct comprising:
   a radially inner wall;
   a radially outer wall positioned about said radially inner wall defining a flow passage therebetween, said radially outer wall extends and is contoured from an upstream end to a downstream end of the transition duct such that a slope of said radially outer wall increases from said upstream end to a predetermined axial location and decreases from the predetermined axial location to said downstream end; and
   a fairing that extends radially between said radially inner wall and said radially outer wall within said flow passage, wherein said fairing comprises an aerodynamic cross-sectional shape;
   wherein the predetermined axial location corresponds to an axial location of a thickest cross-sectional portion of said fairing such that a maximum slope of said radially outer wall is at the predetermined axial location.

2. The transition duct in accordance with claim 1, wherein the slope of said radially outer wall increases from about 0° at said upstream end to greater than about 40° at the predetermined axial location.

3. The transition duct in accordance with claim 1, wherein said radially outer wall comprises a maximum wall slope at the predetermined axial location, the maximum wall slope from about 40° to about 50°.

4. The transition duct in accordance with claim 3, wherein the slope of said radially outer wall decreases from the maximum wall slope to no less than about 30° at said downstream end.

5. The transition duct in accordance with claim 1, wherein said radially inner wall extends and is contoured from said upstream end to said downstream end such that the transition duct has a larger cross-sectional area at said downstream end than said upstream end.

6. The transition duct in accordance with claim 5, wherein the transition duct comprises an area ratio of greater than about 1.35.

7. The transition duct in accordance with claim 1, wherein the transition duct comprises a radius ratio (ΔR/height) of greater than about 2.0.

8. A turbine assembly comprising:
   a high-pressure turbine positioned about a centerline axis at a first radius from the centerline axis;
   a low-pressure turbine positioned about the centerline axis at a second radius from the centerline axis that is greater than the first radius; and
   a transition duct coupled between said high-pressure turbine and said low-pressure turbine, said transition duct comprising:
   a radially inner wall;
   a radially outer wall positioned about said radially inner wall defining a flow passage therebetween, said radially outer wall extends and is contoured from an upstream end to a downstream end of the transition duct such that a slope of said radially outer wall increases from said upstream end to a predetermined axial location and decreases from the predetermined axial location to said downstream end; and
   a fairing that extends radially between said radially inner wall and said radially outer wall within said flow passage, wherein said fairing comprises an aerodynamic cross-sectional shape;
   wherein the predetermined axial location corresponds to an axial location of a thickest cross-sectional portion of said fairing such that a maximum slope of said radially outer wall is at the predetermined axial location.

9. The turbine assembly in accordance with claim 8, wherein said transition duct facilitates reducing flow separation of fluid channeled through said flow passage.

10. The turbine assembly in accordance with claim 8, said radially inner wall extends and is contoured from said upstream end to said downstream end such that the transition duct has a larger cross-sectional area at said downstream end than said upstream end.

11. The turbine assembly accordance with claim 8, wherein the slope of said radially outer wall increases from about 0° at the upstream end to greater than about 40° at the predetermined axial location.

12. The turbine assembly in accordance with claim 8, wherein said radially outer wall comprises a maximum wall slope at the predetermined axial location, the maximum wall slope from about 40° to about 50°.

13. The turbine assembly in accordance with claim 12, wherein the slope of said radially outer wall decreases from the maximum wall slope to no less than about 30° at said downstream end.

14. The turbine assembly in accordance with claim 8, wherein each of said radially inner wall and said radially outer wall extend circumferentially about the centerline axis such that a substantially annular flow passage is defined therebetween.

15. A method of assembling a transition duct for use in a turbine assembly, the transition duct comprising a radially inner wall and a radially outer wall, said method comprising:
   positioning the radially outer wall about the radially inner wall such that a flow passage is defined therebetween;
   extending the radially outer wall from an upstream end to a downstream end of the transition duct;
   contouring the radially outer wall from the upstream end to the downstream end such that a slope of the radially outer wall increases from the upstream end to a predetermined axial location and decreases from the predetermined axial location to the downstream end; and
   providing a fairing that extends radially between said radially inner wall and said radially outer wall within said flow passage, wherein said fairing comprises an aerodynamic cross-sectional shape;
   wherein the predetermined axial location corresponds to an axial location of a thickest cross-sectional portion of said fairing such that a maximum slope of said radially outer wall is at the predetermined axial location.

16. The method in accordance with claim 15, wherein contouring the radially outer wall further comprises increasing the slope of the radially outer wall from about 0° at the upstream end to greater than about 40° at the predetermined axial location.

17. The method in accordance with claim 15, wherein contouring the radially outer wall further comprises contouring the radially outer wall such that a maximum wall slope is located at the predetermined axial location, the maximum wall slope from about 40° to about 50°.

18. The method in accordance with claim 17, wherein contouring the radially outer wall further comprises decreasing the slope of the radially outer wall from the maximum wall slope to no less than about 30° at the downstream end.

* * * * *

UNITED STATES PATENT AND TRADEMARK OFFICE
CERTIFICATE OF CORRECTION

| | | |
|---|---|---|
| PATENT NO. | : 9,222,437 B2 | Page 1 of 1 |
| APPLICATION NO. | : 13/624543 | |
| DATED | : December 29, 2015 | |
| INVENTOR(S) | : Machnaim et al. | |

It is certified that error appears in the above-identified patent and that said Letters Patent is hereby corrected as shown below:

On the title page item (72), under "Inventors", in Column 1, Line 1, delete "IN (US);" and insert -- (IN); --, therefor.

In the claims

In Column 6, Line 29, in Claim 11, delete "assembly accordance" and insert -- assembly in accordance --, therefor.

Signed and Sealed this
Fourteenth Day of June, 2016

Michelle K. Lee
*Director of the United States Patent and Trademark Office*